UNITED STATES PATENT OFFICE.

ALBERT A. SOMERVILLE, OF FLUSHING, NEW YORK, AND MAHLON J. RENTSCHLER, OF WILLOUGHBY, OHIO, ASSIGNORS TO RUBBER REGENERATING COMPANY, A CORPORATION OF INDIANA.

MATERIAL COMPRISING METAL AND VULCANIZED RUBBER.

1,289,566.     Specification of Letters Patent.     Patented Dec. 31, 1918.

No Drawing.     Application filed July 24, 1917. Serial No. 182,406.

*To all whom it may concern:*

Be it known that we, ALBERT A. SOMERVILLE, a citizen of the United States, residing at Flushing, L. I., county of Queens, and State of New York, and MAHLON J. RENTSCHLER, a citizen of the United States, residing at Willoughby, county of Lake, and State of Ohio, have invented certain new and useful Improvements in Materials Comprising Metal and Vulcanized Rubber, of which the following is a full, clear, and exact description.

This invention relates to materials comprising metal and vulcanized rubber or the like such as gutta percha, balata, synthetic rubber, etc., and more particularly to an article trimmed with metal comprising vulcanized rubber free from ingredients adapted to tarnish the metal.

Vulcanized rubber articles trimmed with metals or alloys as heretofore made have been unsatisfactory due to the tarnishing of the metals by the sulfur which has been practically exclusively used as the vulcanizing agent. Such tarnishing is caused principally by the formation of sulfids through contact or proximity of the metal to the sulfur-containing rubber.

The principal objects of the present invention accordingly are to provide a combination of rubber and metal which while possessing the advantages of combinations in which the metal is apt to be tarnished by the rubber, shall be free from the tendency to the tarnishing action mentioned.

Briefly, we accomplish the objects of our invention by combining metallic material with a vulcanized rubber substantially free from sulfur. Specifically we employ rubber vulcanized by dinitrobenzene, trimmed with brass, copper, steel, gold, silver, etc. A satisfactory vulcanized rubber composition free from sulfur and adapted to be used as indicated may be obtained by mixing and subjecting to the vulcanizing process the following ingredients in about the proportions stated:

| | |
|---|---|
| Rubber | 100 parts. |
| Aluminum flake (oxid) | 100 parts. |
| Litharge | 100 parts. |
| Dinitrobenzol | 2 parts. |

Trimmings of metal for trunks, bags, toilet articles, etc., when used with this composition or similar ones are not tarnished thereby.

In accordance with the theory heretofore advanced concerning the vulcanizing action of the nitro-compounds, it is believed that the vulcanizing action by di-nitro-benzene is secured by the activity of one or more of the oxygen atoms of the nitro-groups and it has been found that substances which have active oxygen atoms as di-nitro-benzene are capable of effecting vulcanization to a greater or less degree. The nitro-compounds of the aromatic series are particularly useful the compound used in the preferred composition mentioned above being simply one of a large class of such substances. This class includes nitrobenzol, trinitrobenzols, mono, di- and tri-nitro-toluols, tri- and tetranitronaphthalenes, picric acid, picramic acid, picryl chlorid, artificial musk, nitrocyclohexane, aurotin and other nitro-dye stuffs, and various peroxy compounds such as benzoyl peroxid and perbenzoic acid.

No claim is made to the employment of nitro-compounds *per se* as vulcanizing agents for rubber.

Having thus described our invention, what we claim and desire to protect by Letters Patent is:

1. As a new article, rubber vulcanized by a vulcanizing agent containing oxygen and a metallic material attached thereto.

2. As a new article, rubber vulcanized by a vulcanizing agent containing oxygen and nitrogen and a metallic material attached thereto.

3. As a new article, rubber vulcanized by a vulcanizing agent comprising an organic nitro-compound, trimmed with a metallic material.

4. As a new article, rubber vulcanized by a nitro-benzene trimmed with metallic material.

Signed at New York, New York, this 16th day of July, 1917.

ALBERT A. SOMERVILLE.

Signed at Willoughby, Ohio, this 21st day of July, 1917.

MAHLON J. RENTSCHLER.